(12) United States Patent
Loewenstein et al.

(10) Patent No.: US 9,940,132 B2
(45) Date of Patent: Apr. 10, 2018

(54) LOAD-MONITOR MWAIT

(71) Applicant: Oracle International Corporation, Redwood City, CA (US)

(72) Inventors: Paul N. Loewenstein, Palo Alto, CA (US); Mark A. Luttrell, Cedar Park, TX (US); Paul J. Jordan, Austin, TX (US)

(73) Assignee: Oracle International Corporation, Redwood Shores ( * ) Notice: Subject to any disclaimer, the term of this patent is extended or adjusted under 35 U.S.C. 154(b) by 193 days.

(21) Appl. No.: 14/967,954

(22) Filed: Dec. 14, 2015

(65) Prior Publication Data

US 2016/0098274 A1 Apr. 7, 2016

Related U.S. Application Data

(63) Continuation of application No. 13/607,175, filed on Sep. 7, 2012, now abandoned.

(51) Int. Cl.
| | | |
|---|---|---|
| *G06F 9/30* | (2006.01) |
| *G06F 9/38* | (2018.01) |
| *G06F 11/07* | (2006.01) |
| *G06F 11/30* | (2006.01) |

(Continued)

(52) U.S. Cl.
CPC ........ *G06F 9/30043* (2013.01); *G06F 9/3009* (2013.01); *G06F 9/3851* (2013.01); *G06F 11/0715* (2013.01); *G06F 11/0757* (2013.01); *G06F 11/3017* (2013.01); *G06F 11/3471* (2013.01); *G06F 12/084* (2013.01);
(Continued)

(58) Field of Classification Search
None
See application file for complete search history.

(56) References Cited

U.S. PATENT DOCUMENTS

| | | | | |
|---|---|---|---|---|
| 5,630,095 A | * | 5/1997 | Snyder | ................ G06F 12/0831 365/49.1 |
| 7,640,384 B2 | | 12/2009 | Hammarlund et al. | |

(Continued)

OTHER PUBLICATIONS

Intel 64 and IA-32 Architectures Software Developer's Manual, vol. 3A, May 2012, pp. 8-67-8-74.

*Primary Examiner* — Corey S Faherty
(74) *Attorney, Agent, or Firm* — Meyertons, Hood, Kivlin, Kowert & Goetzel, P.C.

(57) ABSTRACT

Techniques are disclosed relating to suspending execution of a processor thread while monitoring for a write to a specified memory location. An execution subsystem may be configured to perform a load instruction that causes the processor to retrieve data from a specified memory location and atomically begin monitoring for a write to the specified location. The load instruction may be a load-monitor instruction. The execution subsystem may be further configured to perform a wait instruction that causes the processor to suspend execution of a processor thread during at least a portion of an interval specified by the wait instruction and to resume execution of the processor thread at the end of the interval. The wait instruction may be a monitor-wait instruction. The processor may be further configured to resume execution of the processor thread in response to detecting a write to a memory location specified by a previous monitor instruction.

12 Claims, 7 Drawing Sheets

(51) Int. Cl.
*G06F 11/34* (2006.01)
*G06F 12/084* (2016.01)

(52) U.S. Cl.
CPC ............... *G06F 2212/1008* (2013.01); *G06F 2212/251* (2013.01); *Y02B 60/165* (2013.01)

(56) References Cited

U.S. PATENT DOCUMENTS

| | | | | |
|---|---|---|---|---|
| 2003/0088760 | A1* | 5/2003 | Chowdhury | G06F 9/3834 712/225 |
| 2006/0150183 | A1* | 7/2006 | Chinya | G06F 9/45533 718/100 |
| 2006/0150184 | A1* | 7/2006 | Hankins | G06F 9/4843 718/100 |
| 2009/0172284 | A1* | 7/2009 | Offen | G06F 12/084 711/125 |
| 2010/0332538 | A1* | 12/2010 | Gray | G06F 17/30377 707/774 |
| 2011/0154079 | A1* | 6/2011 | Dixon | G06F 1/3203 713/323 |

* cited by examiner

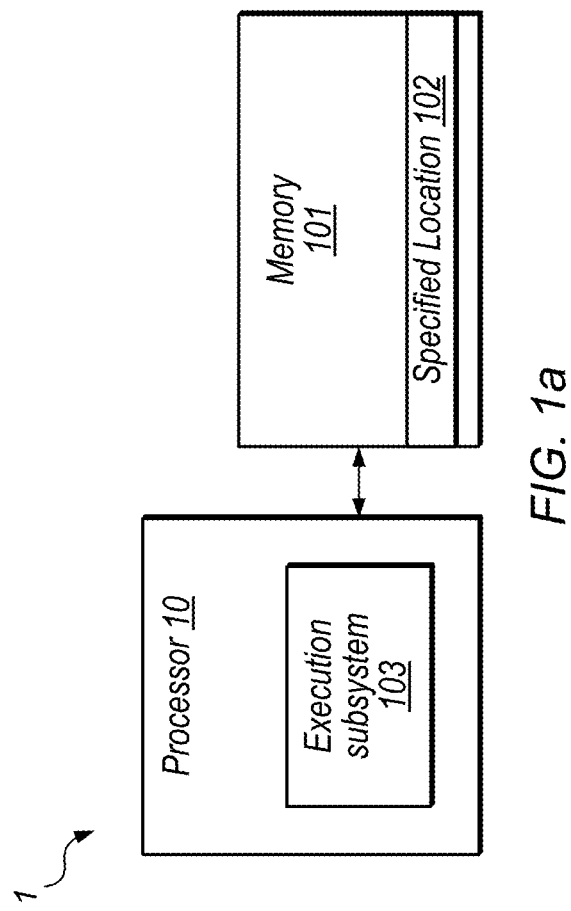

LOAD-MONITOR MWAIT

This application is a continuation of U.S. application Ser. No. 13/607,175, filed on Sep. 7, 2012, which is incorporated by reference herein in its entirety.

BACKGROUND

Technical Field

This disclosure relates to processors, and more specifically to atomic processor instructions and suspending execution of processor threads.

Description of the Related Art

In some processing environments, multiple processor threads may execute on a processor core. Processor "threads" may also be referred to as "strands" or "virtual processors." Different threads on a processor core may share processing resources, including memory. Similarly, in multi-core and/or multi-processor systems, threads running on different processor cores and/or different processors may share processing resources. Synchronization between processor threads may involve a shared memory location that is written by one thread to indicate that another waiting thread can begin or continue execution. In this case, the waiting thread may "spin" by executing a loop to repeatedly check the shared memory location for a write indicating that execution may continue. Spinning may be inefficient, however. Accordingly, it is desirable to pause, suspend, or modify execution of a waiting thread until a write to the shared memory location is detected.

SUMMARY

In one embodiment, an execution subsystem is configured to perform a load instruction that causes an apparatus to retrieve data from a specified memory location and atomically begin monitoring for a write to the specified memory location. The load instruction may be an atomic load-monitor instruction of a particular instruction set architecture. The apparatus may be configured to suspend execution of a thread based on a wait instruction and resume execution of the thread in response to detecting a write to the specified memory location. The execution subsystem may comprise a monitor unit that monitors for conflicting stores to speculatively executed loads stored in a load buffer.

In one embodiment, an execution unit is configured to perform a wait instruction that causes the apparatus to suspend execution of a thread during at least a portion of an interval specified by the wait instruction. In one embodiment, the apparatus resumes execution of the thread based on the interval, e.g., at the end of the interval. The wait instruction may be a monitor-wait instruction. The interval may be specified by a register or as an immediate value in the wait instruction. The apparatus may suspend execution of the thread in response to the interval being longer than a threshold interval.

In various embodiments atomically loading and beginning to monitor may simplify programming and/or improve processing performance. In some embodiments, a wait instruction that specifies an interval may allow for reduced power consumption and/or more efficient use of processing resources during the interval. Further, the specified interval may prevent a thread from being suspended indefinitely.

BRIEF DESCRIPTION OF THE DRAWINGS

FIG. 1a is block diagram illustrating one exemplary embodiment of a processor and a memory;

Figure 1B:
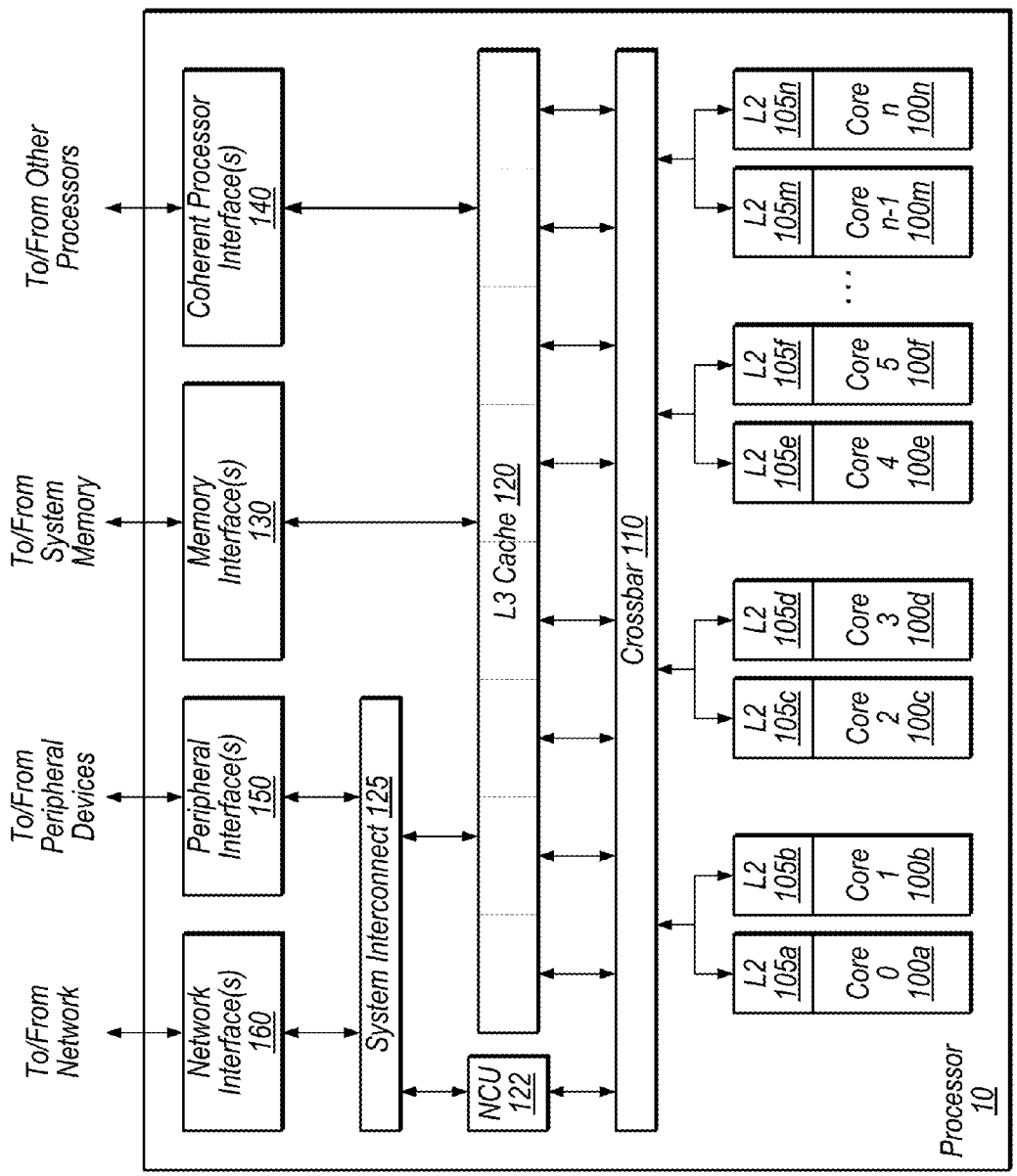
FIG. 1b is a block diagram illustrating one embodiment of an exemplary processor.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

Various units, circuits, components, and other structural elements are described and claimed in this disclosure as "configured to" perform one or more tasks. The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

Introduction

Referring now to FIG. 1a, a block diagram illustrating one embodiment of a system 1 is shown. System 1 includes processor 10 and memory 101. Processor 10 includes execution subsystem 103. Memory 101 includes specified location 102. Execution subsystem 103 may be configured to perform program instructions. In one embodiment, processor 10 is configured to monitor for stores to one or more specified memory locations such as specified location 102 based on an executed program instruction. In various embodiments, memory 101 may reside elsewhere in system 1, such as within processor 10, for example.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter conception may be referred to as "performing" the instruction. For example, in one embodiment, performance of an add instruction refers to adding two operands to produce a result. In one embodiment, performance of a "load" instruction refers to retrieving a value (e.g., from a cache, memory, or stored result of another instruction).

Further, as used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

In one embodiment, execution subsystem 103 is configured to perform a load instruction that causes processor 10 to retrieve data from specified location 102 and atomically begin monitoring for a store (i.e. write) to specified location 102. In one embodiment, the load instruction is an atomic load-monitor instruction, such as an Oracle SPARC LOAD-MONITOR instruction, for example. The term "load-monitor instruction" is intended to include various instructions with various names that indicate load and monitor functionality (specific instructions are indicated in this disclosure using all capital letters—e.g., the Oracle SPARC instruction LOAD-MONITOR). In one embodiment, the load-monitor instruction specifies the memory location. Such an atomic load-monitor instruction may cause processor 10 to ensure that a value stored in specified location 102 is not modified between the load and beginning to monitor. In some embodiments, processor 10 may be configured to monitor for a write to specified location 102 without actually reading from memory 101. For example, processor 10 may detect a write based on a change in a cache, an address on a memory bus during a write cycle, and so on. Therefore, detecting a write of a value to memory 101 may occur before the value is actually written.

As used herein, referring to an instruction as being performed "atomically" or as an "atomic" instructions means that certain operations performed as a result of performance of that instruction occur without other intervening operations. For example, in one embodiment, performance of an atomic load-store instruction causes a load from a specified address and a subsequent store to the specified address. Further, the atomic load-store operation guarantees that no other stores to the specified address occur between the load and the store. Thus, while the load and the store performed as a result of this instruction may not actually occur instantaneously, the performing processing element behaves as if the store occurred instantly after the load by preventing other stores to the specified address from occurring until the store has completed. Similarly, in one embodiment, performance of an atomic load-monitor instruction causes a load from a specified address and a monitor function, and guarantees that no stores to the specified address occur between the load and a beginning of the monitor function.

Further, as used herein, the term "processing element" refers broadly to a hardware element that can execute program instructions. This term may refer to various elements or combinations of elements. Processing elements include, for example, portions or circuits of individual processor cores (such as IFU 200 or a circuit thereof, for example), entire processor cores, individual processors, and/or larger portions of systems that include multiple processors.

In some embodiments, execution subsystem 103 is configured to perform a wait instruction that causes the processor to suspend execution of a processor thread during at least a portion of an interval specified by the wait instruction. Execution subsystem 103 may be configured to resume execution of the processor thread at the end of the interval or in response to detecting a write to a memory location specified by a previous monitor instruction.

The previous monitor instruction may be an atomic load-monitor instruction or a monitor instruction. In some embodiments, the wait instruction may be a monitor-wait (mwait) instruction. Such a wait instruction may allow for reduced power consumption and/or more efficient use of processor resources during the interval. Further, the specified interval may prevent a thread from remaining suspended indefinitely while monitoring for a write to the specified memory location.

General Overview of a Multithreaded Processor

Turning now to FIG. 1b, a block diagram illustrating one embodiment of a processor 10 is shown. In certain embodiments, processor 10 may be multithreaded. In the illustrated embodiment, processor 10 includes a number of processor cores 100a-n, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9 or Oracle SPARC, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a write-back buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
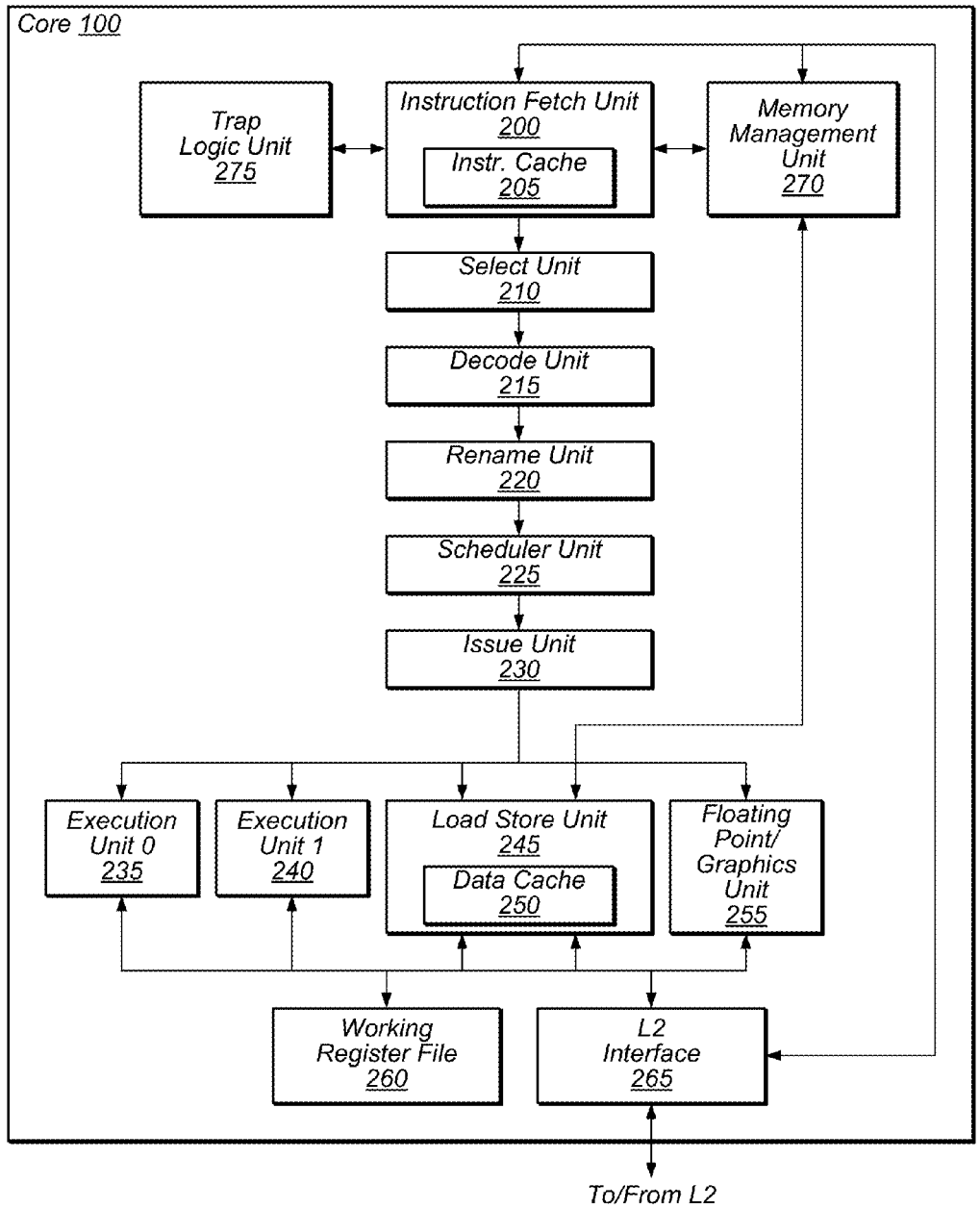
FIG. 2 is a block diagram illustrating one embodiment of an exemplary processor core.

Turning now to FIG. 2, one embodiment of core 100 that is configured to perform dynamic multithreading is depicted. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a scheduler unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually performed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, scheduler unit 225 may be configured to pick (i.e., schedule/dispatch) instructions that are ready for execution and send the picked instructions to issue unit 230. In one embodiment, scheduler unit 225 may be configured to maintain a schedule queue that stores a number of decoded and renamed instructions as well as information about the relative age and status of the stored instructions. During each execution cycle, this embodiment of scheduler unit 225 may pick up to one instruction per slot. For example, taking instruction dependency and age information into account, for a given slot, scheduler unit 225 may be configured to pick the oldest instruction for the given slot that is ready to execute.

In some embodiments, scheduler unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, scheduler unit 225 may be configured to deliberately insert "holes" (as referred to as "bubbles") into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution (i.e., performance). In one embodiment, each of EXU0 235 and EXU1 240 may be similarly or identically configured to perform certain integer-type instructions defined in the implemented ISA, such as arithmetic, logical, and shift instructions. In the illustrated embodiment, EXU0 235 may be configured to perform integer instructions issued from slot 0, and may also perform address calculation and for load/store instructions performed by LSU 245. EXU1 240 may be configured to perform integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

In one embodiment, LSU 245 may be configured to ensure correct ordering of loads from memory using a load buffer. In one embodiment, LSU 245 includes hardware configured to support atomic load-monitor instructions.

Floating-point/graphics unit 255 may be configured to perform and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed. In one embodiment, TLU 275 is configured to prevent IFU 200 from fetching instructions from a processor thread that has been suspended.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Overview of Shared Memory Monitoring and Thread Suspension

In various embodiments, a core 100 may be configured to suspend execution of a processor thread or put the thread into an implementation-dependent state while monitoring for a write to a specified memory location. For example, a core 100 may begin monitoring for a write to a memory location specified by a load instruction and/or a monitor instruction. A load instruction may be an Oracle SPARC atomic LOAD-MONITOR instruction while a monitor instruction may be an INTEL® 64, IA-32, or AMD 64® MONITOR instruction, for example. Subsequently, a core 100 may suspend a processor thread based on a wait instruction. A wait instruction may be an INTEL® 64, IA-32, SPARC®, or AMD 64® MWAIT instruction, for example. Core 100 may resume execution of a suspended thread in response to detecting a write to the specified memory location. For example, another thread may write to the specified memory location in order to indicate that a processing resource (e.g., an execution resource or a semaphore) may be available for the suspended core. Thus, core 100 may resume execution of the suspended thread in order to execute instructions using the processing resource. In some embodiments, a core 100 may resume execution of the suspended thread after a timeout interval specified by the wait instruction.

In some embodiments, a monitor unit may be included in or implemented by an execution subsystem such as LSU 245 or may be implemented by L2 interface 265 or some other processor element. The monitor unit may be configured to monitor a specified memory location or range of memory locations in order to detect a write to the specified memory location(s).

Atomic Load-Monitor

Figure 3:
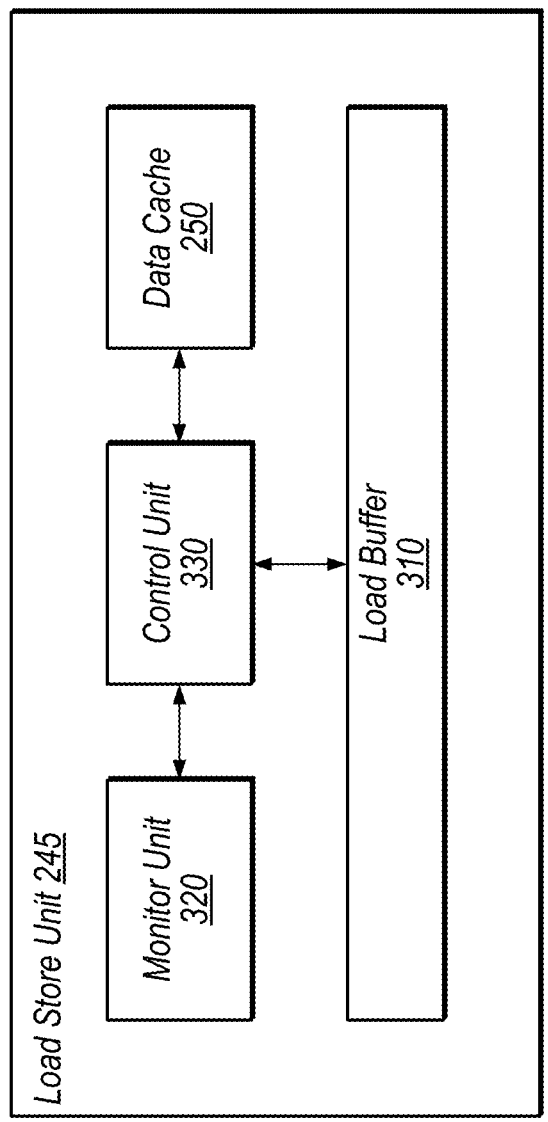
FIG. 3 is a block diagram illustrating one embodiment of an exemplary load store unit.

Referring now to FIG. 3, one exemplary embodiment of a load store unit (LSU) 245 is shown. In some embodiments, LSU 245 corresponds to execution subsystem 103 of FIG. 1a. In the illustrated embodiment, LSU 245 includes load buffer 310, monitor unit 320, control unit 330, and data cache 250. Data cache 250 may be configured as described above with reference to FIG. 2. Load buffer 310 may be configured to store speculatively performed loads (i.e., information corresponding to speculatively performed loads such as values from a cache or memory). Monitor unit 320 may be configured to monitor for conflicting stores to speculatively performed loads and/or for stores to locations specified by load-monitor or monitor instructions. Monitor unit 320 may reside in LSU 245 as shown in FIG. 3 or may reside elsewhere within core 100. Control unit 330 may be configured to control operation of various elements of LSU 245.

In some embodiments, loads may be performed as soon as possible, i.e. in a speculative manner. Values for loads may be read from data cache 250, another cache, and/or a memory. Speculatively performed loads may be stored in load buffer 310. In one embodiment, monitor unit 320 is a processing element configured to check a loaded value for conflicting writes until a load is the oldest load in load buffer 310, at which point LSU 245 may retire or complete the load. If a conflicting write is detected (e.g., a write to the memory location of the load that is earlier in program order), the load may be flushed from load buffer 310 and retried or "replayed."

As used herein there terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

In various embodiments, in response to a load-monitor instruction, monitor unit 320 is configured to continue monitoring for writes to the memory location specified by a load even after completion of the load. In these embodiments, monitor unit 320 may be configured to monitor for writes to the specified memory location regardless of whether they precede the load in program order. A load instruction may be a load-monitor instruction while a monitor instruction may be an INTEL® 64, IA-32, or AMD 64® MONITOR instruction, for example. In some embodiments, based on a wait instruction (e.g., an mwait instruction) that is received while monitor unit 320 is monitoring for a write to a specified location, core 100 may be configured to suspend execution of a thread until a write to the specified location is detected by monitor unit 320.

In one embodiment, monitor unit 320 is configured to monitor for a write based on the state of one or more cache lines of a cache such as data cache 250. Monitor unit 320 may detect a write based on a change in state of the cache line such as invalidation of the cache line, a store to the cache line, and so on. In one embodiment, monitor unit 320 is configured detect writes by processor threads other than the processor thread that began monitoring. In one embodiment, an L2 cache may be inclusive of data cache 250, and all stores to data cache 250 may be written to the L2 cache. In this embodiment, monitor unit 320 may monitor for a write based on the state of one or more cache lines of the L2 cache. In embodiments where monitor unit 320 detects a write based on a state of a cache line, monitor unit 320 may occasionally detect false events. For example, a cache line may be replaced by another cache line (e.g., according to a least-recently-used methodology) even though a write to a location corresponding to the cache line did not occur. In some embodiments, such false events may result in waking a processor thread early, which may waste processing power and/or resources. However, monitoring the state of a cache line may require less hardware compared to other methodologies for detecting writes, which may reduce power consumption and area. Therefore, this embodiment may be preferable in some designs.

In another embodiment, monitor unit 320 is configured to monitor for a write by monitoring for the address associated with the write on an address bus during a write cycle. Such "snooping" of the address bus may allow core 100 to monitor for a write to without actually polling the memory, but may involve more complex hardware than embodiments in which monitor unit 320 monitors for a write based on the state of a cache. Monitor unit 320 may be configured to begin such monitoring atomically with loading from a specified memory location.

In other embodiments, monitor unit 320 may be configured to atomically load from a specified memory location and begin to monitor for a write to the specified memory location based on various appropriate monitoring methodologies. For example, monitor unit 320 may read from the memory location in a loop in order to detect a change to a value stored in the memory location, or to detect a particular value.

To begin monitoring for writes to a specified location atomically with loading from the specified location, one or more processing elements of core 100 may ensure that no write to the specified location occurs between a point in time when a value associated with the load is retrieved from a cache or memory and a point in time when monitor 320 begins to monitor for a write to the specified location. In embodiments where monitor unit 320 is configured to monitor for writes to locations specified by speculatively performed loads in load buffer 310, this atomicity is achieved because monitoring begins as soon as the load is speculatively performed. Thus, if monitor unit 320 detects a load to the location specified by a load-monitor instruction, appropriate action may be taken to ensure the atomicity of the loading and beginning to monitor.

For example, in one embodiment, when a write to the specified location is detected, the load may be retried or replayed to obtain the new value of the specified location. In another embodiment, when a write to the specified location is detected, the load may not be replayed, but monitor unit 320 may indicate that a write to the specified location occurred. In another embodiment, detected writes that are earlier in program order than a load cause the load to be replayed while writes that are later in program order than a load cause monitor unit 320 to indicate that a write to the specified location occurred (which may cause resumption of a suspended processor thread or prevention of suspending a processor thread in some situations). In various embodiments, various other methodologies may be implemented by core 100 to ensure that the loading and the monitoring of a load-monitor instruction are performed atomically.

Atomic load-monitor instructions may prevent a need to re-load a value from a specified location after beginning to monitor the specified location in order to ensure that no write to the location occurred between a first load and beginning to monitor for the location. Therefore, atomic load-monitor instructions may simplify programming and/or compiler design and may improve processor performance.

Thread Suspension and Timeout Interval

In various embodiments, various elements of a processor core may be configured to suspend execution of a thread based on a wait instruction such as mwait. For example, in one embodiment, TLU 275 is configured to prevent IFU 200 from fetching instructions from a processor thread, thus suspending execution of the thread. In another embodiment, select unit 210 is configured to not select instructions from the thread even if they are fetched. In another embodiment, scheduler unit 225 is configured to not dispatch instructions from the thread. In another embodiment, issue unit 230 is configured to not issue instructions from the thread. In other embodiments, other elements of a processor may be configured to suspend execution of a thread.

In some embodiments, a wait instruction such as mwait includes a timeout interval (i.e., a suspension interval). In one embodiment, when core 100 suspends execution of a thread based on such a wait instruction, the core 100 resumes execution of the thread after the end of the interval. This may prevent a thread from remaining suspended indefinitely if a write to a specified memory location is not detected. In one embodiment, an mwait instruction includes the duration of the interval as an immediate value in the instruction. In another embodiment, an mwait instruction indicates a register that stores a value corresponding to the duration of the interval. In various embodiments, an instruction may indicate the interval using any appropriate value, indicator, pointer, opcode, etc. In one embodiment, an mwait instruction suspends a thread until a write is detected to a memory location specified by a most recently executed load-monitor instruction (i.e., no other load-monitor instructions were executed between the most recently executed load-monitor instruction and the mwait instruction).

In one embodiment, an mwait instruction may specify a write to a register such as an ancillary state register, a coprocessor register, or a model-specific register, for example. This embodiment may include an mwait register, and an mwait instruction may be defined as a write to that register. In one embodiment, the mwait register stores the interval. In one embodiment, the interval may be specified as an exclusive- or of an immediate value specified by an mwait instruction and a previous value in the mwait register. The timeout interval may be implemented by a timer, by decrementing a value in the mwait register, or various other appropriate methodologies for time measurement.

In one embodiment, a wait instruction may be processed as a NOP (no operation) under certain conditions. For example, an mwait instruction may be processed as a NOP if no load-monitor instruction has been previously executed or if between execution of the most recent previously-executed load-monitor instruction and performance of the wait instruction: the memory location accessed by the load-monitor instruction was modified by a virtual processor other than the virtual processor executing the wait instruction, another wait instruction was executed, a trap occurred, or certain other synchronous or asynchronous events occurred.

According to some embodiments, core 100 may implement threshold interval. In these embodiments, if a wait instruction specifies an interval that is shorter than the threshold interval, core 100 does not suspend execution of a thread based on the wait instruction. But, if a monitor-wait instruction specifies an interval that is greater than the threshold interval, core 100 may suspend execution of a strand. In various embodiments, the threshold interval may be programmable or may be implementation specific.

For example, in one embodiment, core 100 may implement a threshold interval of one hundred clock cycles. In this embodiment, a wait instruction that specifies a suspension interval of less than one hundred cycles does not cause suspension of a processor thread. But, in this embodiment, a wait instruction that specifies a suspension interval of more than one hundred clock cycles may cause suspension of a processor thread. The threshold interval may prevent a thread from being suspended for short time intervals because short suspensions may be inefficient in terms of power consumption or other processing resources.

In some embodiments, a thread may remain suspended until one of these events occurs: the end of the interval, a memory write to a monitored location, an asynchronous trap, or certain other asynchronous or synchronous events. In some embodiments, an mwait instruction with an interval of zero may be used to nullify the effect of an earlier load-monitor instruction. For example, monitor unit 320 may suspend monitoring a location specified by a previous load-monitor instruction based on an mwait instruction with an interval of zero.

In one embodiment, a processing element is configured to indicate the reason for resuming execution of a thread. For example, the processing element may set (or clear, depending on configuration) a particular bit to indicate that execution was resumed based on a timeout interval. Similarly, the processing element may clear (or set, depending on configuration) the particular bit to indicate that execution was resumed based on detection of a write to a specified memory location. As another example, a trap or exception may be used to indicate that execution was resumed based on a timeout interval. In various embodiments, various types of indicators may be used to indicate the basis for resuming execution of a thread. Resumed threads may have access to such indicators (i.e., the indicator may be software accessible). A resumed thread may modify its execution based on the indicator.

In some embodiments, the mwait and load-monitor instructions may be available at various privilege levels of core 100. Thus, applications running at a relatively low privilege level may be permitted to execute such instructions.

Figure 4B:
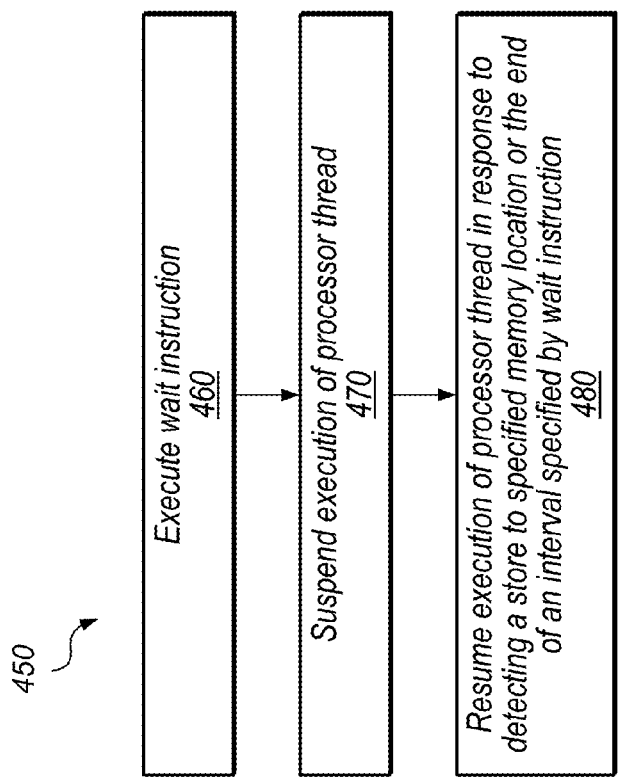
FIG. 4b is a flow diagram illustrating one embodiment of an exemplary method for suspending execution of a processor thread during a specified interval.
Figure 4A:
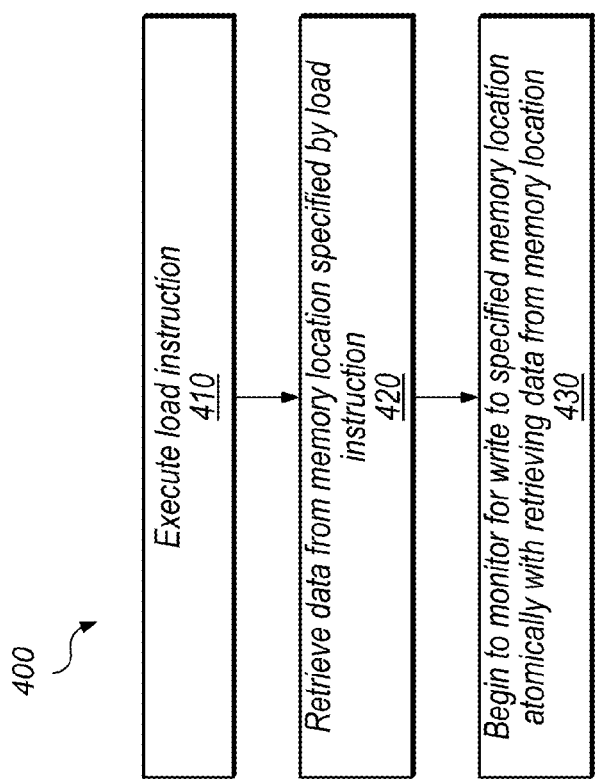
FIG. 4a is a flow diagram illustrating one embodiment of an exemplary method for atomically loading and beginning to monitor a memory location.

Turning now to FIG. 4*a*, a flow diagram illustrating one exemplary embodiment of a method 400 for atomically executing a load and beginning to monitor a memory location is shown. The method shown in FIG. 4*a* may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410 a load instruction is performed. In one embodiment, the load instruction is an atomic load-monitor instruction. In one embodiment, the load instruction is performed by a load store unit such as LSU 245. Flow proceeds to block 420.

At block 420, data is retrieved from a memory location specified by the load instruction. Said another way, the load is performed, which may be considered part of the performing of block 410. In some embodiments, the data may be speculatively retrieved (i.e., the load instruction may be speculatively performed). The data may be retrieved directly from the memory location, or from a cache location corresponding to the memory location such as data cache 250. Flow proceeds to block 430.

At block 430 one or more processing elements begin to monitor for a write to the specified memory location atomically with retrieving data from the memory location. Said another way, monitoring begins as soon as the load is performed, such that no stores occur between the load and beginning to monitor for the load. A processor may include one or more processing elements that guarantee the atomicity of the loading and beginning to monitor. In one embodiment, a monitor unit checks for conflicting stores to speculatively performed loads in a load buffer to ensure that the load-monitor is atomic. In some embodiments, the atomic nature of the load-monitor may avoid a need to load a second time to ensure that no store occurred between the load and beginning to monitor. Flow ends at block 430.

Turning now to FIG. 4b, a flow diagram illustrating one exemplary embodiment of a method 450 for executing a wait instruction that specifies an interval is shown. The method shown in FIG. 4b may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

In some embodiments, the elements of method 450 of may be combined with the elements of method 400 of FIG. 4a to implement another method. For example, the elements of FIG. 4b may be performed after the elements of FIG. 4a. In this example, the wait instruction of FIG. 4b may be executed after the load instruction of FIG. 4a.

At block 460 a wait instruction is performed. In one embodiment, the wait instruction is an mwait instruction that specifies an interval. The interval may be specified using an immediate value (i.e. a value included in a portion of the instruction), or the instruction may indicate a register that stores a value corresponding to the interval. In one embodiment, the mwait instruction is defined by an instruction set architecture as a write to an mwait register, and the interval is written to the mwait register. Flow proceeds to block 470.

At block 470 execution of a processor thread is suspended. In one embodiment, TLU 275 suspends execution of the processor thread by indicating that IFU 200 should refrain from fetching instructions for the thread. In various embodiments, select unit 210, scheduler unit 225, issue unit 230, IFU 200, a completion unit, or various other appropriate processor elements may be configured to suspend execution of the thread. Flow proceeds to block 480.

At block 480 execution of the processor thread is resumed in response to detecting a store to a specified memory location or the end of the interval specified by the wait instruction. Note that execution of the thread may be resumed in response to either of these events. In one embodiment, execution of the thread is resumed by the processing element that suspended execution of the thread in block 470. For example, in one embodiment, TLU 275 is configured to resume execution of the thread in response to an indication (e.g., from monitor unit 320) that a store to a memory location specified by a previous monitor or load-monitor instruction occurred. In this embodiment, TLU 275 is also configured to resume execution of the thread in response to detecting the end of the interval specified by the wait instruction. In one embodiment, a processing element indicates whether execution of a thread is resumed in response to the end of the interval or in response to a store to a specified memory location. Resuming execution of a thread at the end of a specified interval may prevent a thread from remaining suspended indefinitely if no store to a specified memory location is detected. Flow ends at block 480.

Figure 5:
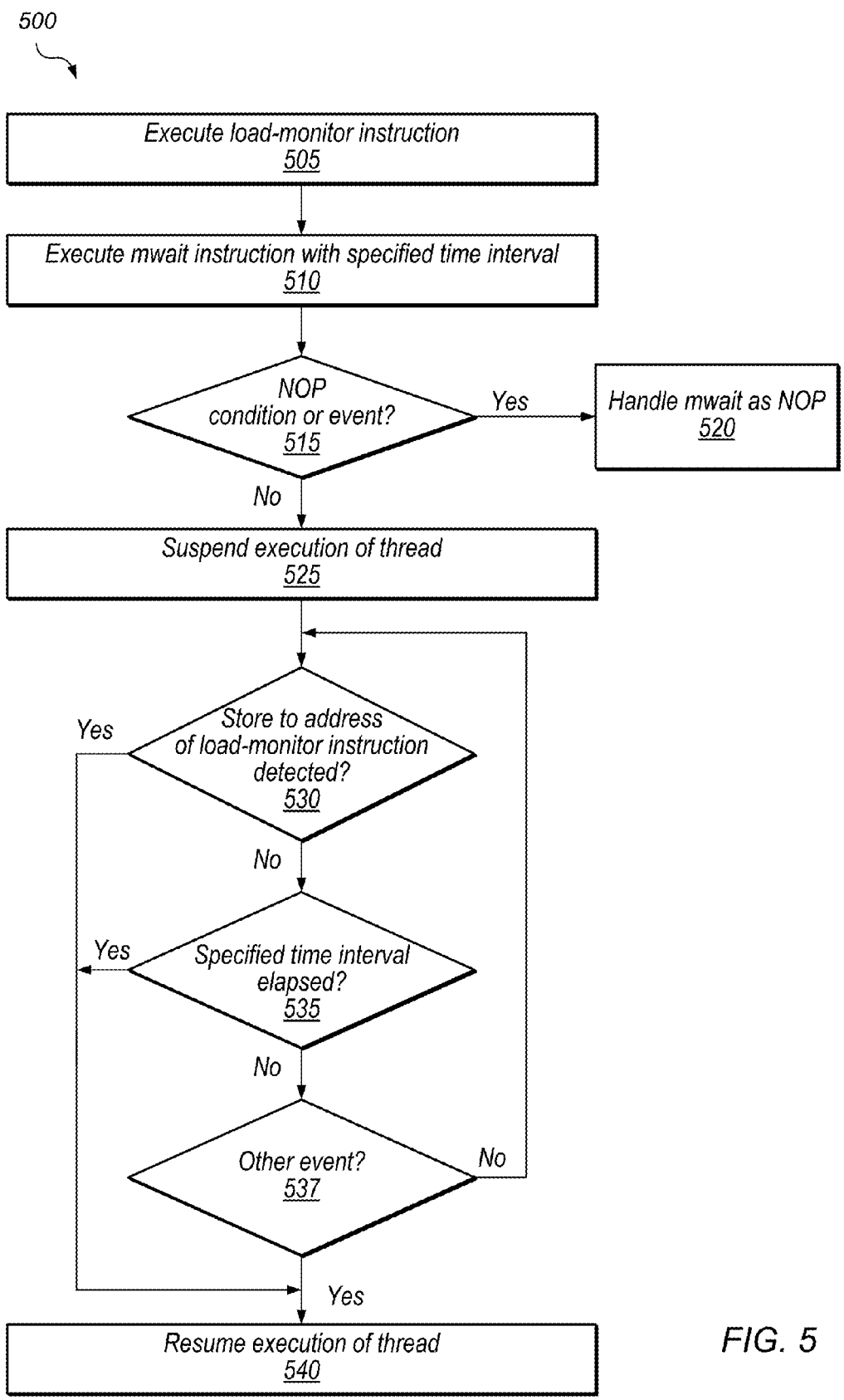
FIG. 5 is a flow diagram illustrating a more detailed embodiment of an exemplary method for suspending execution of a processor thread.

Turning now to FIG. 5, a flow diagram illustrating a more detailed exemplary embodiment of a method 500 for thread management is shown. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Method 500 is a more specific embodiment of a method that may correspond to a combination of the methods of FIGS. 4a and 4b. Flow begins at block 505.

At block 505 a load-monitor instruction is performed. In one embodiment, the load-monitor instruction specifies that a load from a specified memory location and beginning to monitor for a write to the specified memory location are performed atomically. In one embodiment, the load-monitor instruction is performed by LSU 245. Flow proceeds to block 510.

At block 510 an mwait instruction with a specified time interval is performed. In various embodiments, the time interval may be specified using methodologies such as those described above with reference to FIG. 4b. Flow proceeds to decision block 515.

At block 515, it is determined whether a condition or event has occurred such that the mwait instruction should be handled as a NOP. One example of such a condition is a situation in which no load-monitor instruction has previously been executed. In another exemplary situation, the specified memory location was modified by a thread other than the thread executing the mwait instruction between execution of the most recent previously-executed load-monitor instruction and execution of the mwait instruction. As yet another example, a trap or certain other synchronous or asynchronous events occurred between execution of the most recent previously-executed load-monitor instruction and execution of the mwait instruction. If one or more of such events or conditions occurs, flow proceeds to block 520. Otherwise, flow proceeds to block 525.

At block 520, the mwait instruction is treated as a NOP. In other words, the state of core 100 is not affected by the mwait instruction. This may be desirable if a trap or exceptional event occurred, or if another thread has already written to the monitored memory location. Flow ends at block 520.

At block 525 execution of the thread comprising the mwait instruction is suspended. Various elements of a core 100 may suspend execution of a thread based on various additional conditions as described above with reference to FIG. 4b. Flow proceeds to decision block 530.

At decision block 530 it is determined whether a store to the address specified from the load-monitor instruction is detected. Various methodologies may be used to monitor for such a store, as described above with reference to FIG. 4a. If the result of decision block 530 is "yes," flow proceeds to block 540. Otherwise, flow proceeds to decision block 535.

At decision block 535, it is determined whether the time interval specified by the mwait instruction has elapsed. In one embodiment, a counter may facilitate this determination. In one embodiment, a timer interrupt may occur when the interval has elapsed. If the result of decision block 535 is "yes," flow proceeds to block 540. Otherwise, flow proceeds to decision block 537.

At block 537, it is determined whether another event has occurred. The other event may be a trap request, or another synchronous or asynchronous event. For example, core 100 may resume execution of the thread in order to execute a trap routine indicated by a trap request. The other event may also be a change in processing state of a thread, such as a power-management related event, for example. As another example, in one embodiment, core 100 may change the processing state of a thread by indicating whether the thread should be running. Thus, in a situation where the processing state of a thread is changed (while the thread is suspended) to indicate that the thread should not be running, core 100 may resume execution of the thread in order to stop or "park" the thread, for example. If the result of decision block 537 is "yes," flow proceeds to block 540. Otherwise, flow proceeds to decision block 530 (i.e., the thread remains suspended while core 100 monitors for a store to the specified memory location).

At block 540 execution of the thread is resumed. As illustrated by FIG. 5, execution may be resumed based on either detecting a store to the specified memory location or the end of the interval. Flow ends at block 540.

The embodiment illustrated by FIG. 5 may allow for efficient use of processing resources by suspending processor threads to free shared processing resources for other processor threads. In particular, an atomic load-monitor instruction may allow a processor to begin monitoring for a store to a specified memory location without reading from the location a second time to determine whether the location was modified between a first read and beginning to monitor. Further, an mwait instruction that specifies a timeout interval may prevent a thread from remaining suspended indefinitely, thus preventing processor errors or exceptions.

Exemplary System Embodiment

Figure 6:
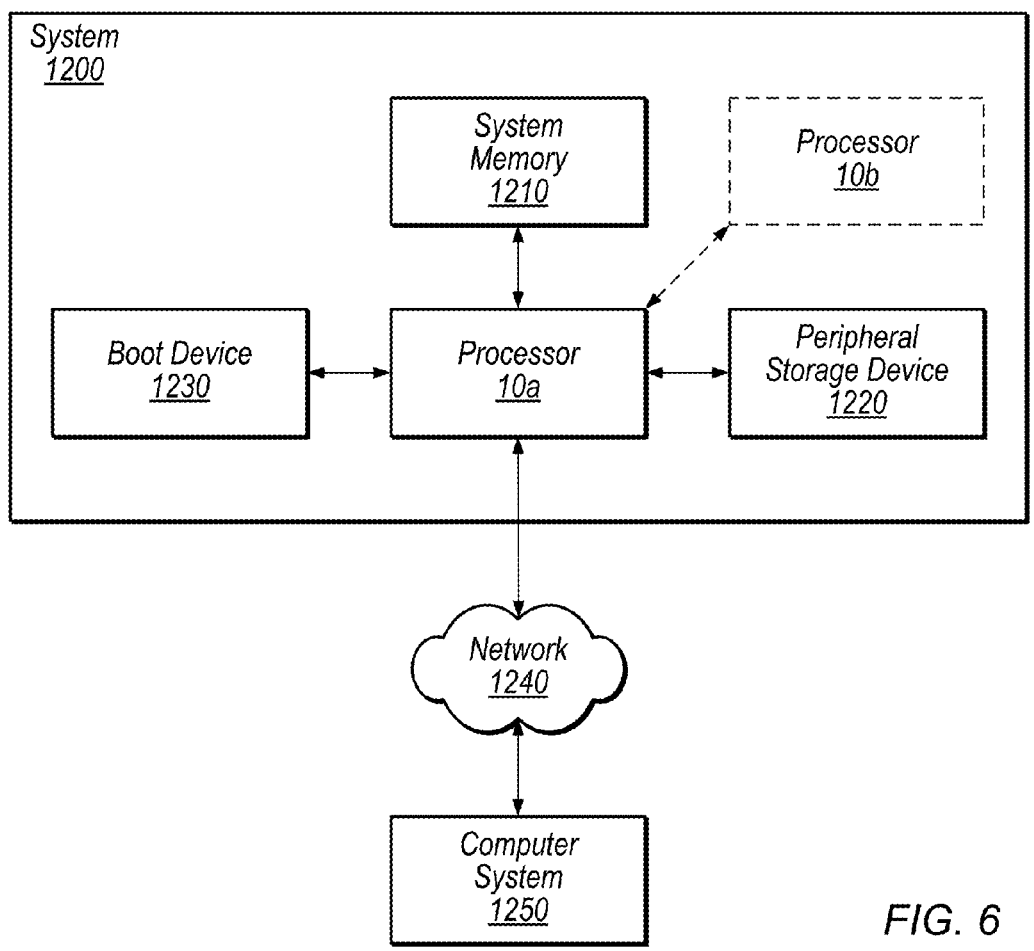
FIG. 6 is a block diagram illustrating one embodiment of an exemplary system.

As described above, in some embodiments, processor 10 of FIG. 1b may be configured to interface with a number of external devices. One embodiment of a system 1200 including processor 10 is illustrated in FIG. 6. In the illustrated embodiment, system 1200 includes an instance of processor 10, shown as processor 10a, that is coupled to a system memory 1210, a peripheral storage device 1220 and a boot device 1230. System 1200 is coupled to a network 1240, which is in turn coupled to another computer system 1250. In some embodiments, system 1200 may include more than one instance of the devices shown. In various embodiments, system 1200 may be configured as a rack-mountable server system, a standalone system, or in any other suitable form factor. In some embodiments, system 1200 may be configured as a client system rather than a server system.

In some embodiments, system 1200 may be configured as a multiprocessor system, in which processor 10a may optionally be coupled to one or more other instances of processor 10, shown in FIG. 6 as processor 10b. For example, processors 10a-b may be coupled to communicate via their respective coherent processor interfaces 160.

In various embodiments, system memory 1210 may comprise any suitable type of system memory as described above, such as FB-DIMM, DDR/DDR2/DDR3/DDR4 SDRAM, RDRAM®, flash memory, and of various types of ROM, etc. System memory 1210 may include multiple discrete banks of memory controlled by discrete memory interfaces in embodiments of processor 10 that provide multiple memory interfaces 130. Also, in some embodiments, system memory 1210 may include multiple different types of memory.

Peripheral storage device 1220, in various embodiments, may include support for magnetic, optical, or solid-state storage media such as hard drives, optical disks, nonvolatile RAM devices, etc. In some embodiments, peripheral storage device 1220 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1220 may be coupled to processor 10 via peripheral interface(s) 150 of FIG. 1b.

As described previously, in one embodiment boot device 1230 may include a device such as an FPGA or ASIC configured to coordinate initialization and boot of processor 10, such as from a power-on reset state. Additionally, in some embodiments boot device 1230 may include a secondary computer system configured to allow access to administrative functions such as debug or test modes of processor 10.

Network 1240 may include any suitable devices, media and/or protocol for interconnecting computer systems, such as wired or wireless Ethernet, for example. In various embodiments, network 1240 may include local area networks (LANs), wide area networks (WANs), telecommunication networks, or other suitable types of networks. In some embodiments, computer system 1250 may be similar to or identical in configuration to illustrated system 1200, whereas in other embodiments, computer system 1250 may be substantially differently configured. For example, computer system 1250 may be a server system, a processor-based client system, a stateless "thin" client system, a mobile device, etc. In some embodiments, processor 10 may be configured to communicate with network 1240 via network interface(s) 160 of FIG. 1b.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a load buffer configured to receive load data, store the load data according to program order of corresponding load operations, and complete load operations by writing the load data to a target memory location, wherein the apparatus is configured to perform load operations out of program order;
an execution subsystem configured to:
suspend a thread based on execution of a wait instruction;
perform a load-monitor instruction, including to:
speculatively cause the apparatus to retrieve data from a specified memory location and store the retrieved data in the load buffer;
begin to monitor, atomically with retrieving the data and prior to storing the data in a target location of the load-monitor instruction, for a write to the specified memory location without accessing the specified memory location;
re-retrieve data from the specified memory location into the load buffer, while the thread is suspended, in response to detecting a write to the specified memory location that is earlier in program order than the load-monitor instruction, wherein the write is detected while the retrieved data is stored in the load buffer; and
generate a detection signal in response to detecting a write to the specified memory location that is later in program order than the load-monitor instruction and resume the thread in response to the detection signal.

2. The apparatus of claim 1, wherein to monitor for a write to the specified memory location without accessing the specified memory location, the apparatus is configured to monitor an address bus for an address corresponding to the specified memory location.

3. The apparatus of claim 1, wherein to monitor for a write to the specified memory location without accessing the specified memory location, the apparatus is configured to monitor for a change in state of a cache line associated with the specified memory location.

4. The apparatus of claim 3, wherein the apparatus is configured to monitor for a store to the cache line or an invalidation of the cache line.

5. The apparatus of claim 1, wherein the execution subsystem is a load/store unit.

6. A method, comprising:
a processor performing a plurality of load operations out of program order;
an execution subsystem of the processor suspending a thread based on execution of a wait instruction;
the execution subsystem of the processor performing a load-monitor instruction, including:
speculatively retrieving data from a specified memory location and storing the retrieved data in a load buffer, wherein the load buffer stores load data according to program order of corresponding load operations and completes load operations by writing the load data to a target memory location, wherein the processor performs ones of the load operations out of program order;
beginning to monitor, atomically with retrieving the data and prior to storing the data in a target location of the load-monitor instruction, for a write to the specified memory location without accessing the specified memory location;
re-retrieving data from the specified memory location into the load buffer, while the thread is suspended, in response to detecting a write to the specified memory location that is earlier in program order than the load-monitor instruction, wherein the write is detected while the retrieved data is stored in the load buffer; and
generating a detection signal in response to detecting a write to the specified memory location that is later in program order than the load-monitor instruction and resume the thread in response to the detection signal.

7. The method of claim 6, wherein monitoring for a write to the specified memory location without accessing the specified memory location, includes monitoring an address bus for an address corresponding to the specified memory location.

8. The method of claim 6, wherein monitoring for a write to the specified memory location without accessing the specified memory location, includes monitoring for a change in state of a cache line associated with the specified memory location.

9. The method of claim 8, wherein the monitoring is for a store to the cache line or an invalidation of the cache line.

10. The method of claim 6, further comprising: flushing data from the load buffer and replaying a speculatively executed load in response to detecting a conflicting write.

11. An apparatus, comprising:
an execution subsystem configured to:
suspend a thread based on execution of a wait instruction;
perform a load-monitor instruction, including to:
speculatively cause the apparatus to retrieve data from a specified memory location and store the retrieved data in a load buffer;
begin to monitor, atomically with retrieving the data and prior to storing the data in a target location of the load-monitor instruction, for a write to the specified memory location without accessing the specified memory location;
re-retrieve data from the specified memory location into the load buffer, while the thread is suspended, in response to detecting a write to the specified memory location that is earlier in program order than the load-monitor instruction, wherein the write is detected while the retrieved data is stored in the load buffer; and
generate a detection signal in response to detecting a write to the specified memory location that is later in program order than the load-monitor instruction and resume the thread in response to the detection signal;
wherein to monitor for a write to the specified memory location without accessing the specified memory location, the apparatus is configured to:
monitor an address bus for an address corresponding to the specified memory location; or
monitor for a change in state of a cache line associated with the specified memory location.

12. The apparatus of claim 11, wherein the execution subsystem is a load/store unit.

* * * * *

UNITED STATES PATENT AND TRADEMARK OFFICE
CERTIFICATE OF CORRECTION

PATENT NO. : 9,940,132 B2
APPLICATION NO. : 14/967954
DATED : April 10, 2018
INVENTOR(S) : Loewenstein et al.

It is certified that error appears in the above-identified patent and that said Letters Patent is hereby corrected as shown below:

In the Specification

In Column 19, Line 44, delete "exclusive- or" and insert -- exclusive-or --, therefor.

In the Claims

In Column 25, Line 9, in Claim 1, delete "to:" and insert -- to; --, therefor.

Signed and Sealed this
Twenty-eighth Day of August, 2018

Andrei Iancu
*Director of the United States Patent and Trademark Office*